US007983563B1

(12) United States Patent
Uhlhorn et al.

(10) Patent No.: US 7,983,563 B1
(45) Date of Patent: Jul. 19, 2011

(54) INTERNET PROTOCOL ROUTING WITH OPTICAL CODE DIVISION MULTIPLE ACCESS

(75) Inventors: Brian L. Uhlhorn, St. Paul, MN (US); Howard J. Schantz, Inver Grove Heights, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 817 days.

(21) Appl. No.: 11/983,270

(22) Filed: Nov. 8, 2007

(51) Int. Cl.
*H04J 14/02* (2006.01)
(52) U.S. Cl. ........................... 398/78; 398/89
(58) Field of Classification Search ............ 398/77, 398/78, 89
See application file for complete search history.

(56) References Cited

U.S. PATENT DOCUMENTS

| | | | |
|---|---|---|---|
| 6,519,060 B1* | 2/2003 | Liu | 398/49 |
| 7,242,870 B2* | 7/2007 | Guan et al. | 398/180 |
| 7,725,035 B2* | 5/2010 | Tyan et al. | 398/115 |

OTHER PUBLICATIONS

Architectural considerations for photonic IP router based upon optical code correlation; Kitayama et al.; Lightwave Technology, Journal of; vol. 18 ,Issue: 12; Digital Object Identifier: 10.1109/50.908749; Publication Year: 2000 , pp. 1834-1844.*
Optical code-wavelength conversion for hybrid OCDM/WDM networks; Kitayama et al.; Optical Communication, 1998. 24th European Conference on; vol. 1, Digital Object Identifier: 10.1109/ECOC.1998.732579, Publication Year: 1998 , pp. 339-340.*

* cited by examiner

*Primary Examiner* — Nathan M Curs
(74) *Attorney, Agent, or Firm* — Brooks, Cameron & Huebsch, PLLC

(57) ABSTRACT

Systems, networks, and methods of providing an Internet protocol routing network are disclosed. One Internet protocol routing network includes: a number of local subnet routers, where the routers are Internet protocol (IP) enabled; a single mode optical fiber cable, where the local subnet routers are coupled to the optical fiber cable; and one or more optical code division multiple access (OCDMA) encoder/decoder coupled to the optical fiber cable, where a number of channels associated with the local subnet routers are assigned an OCDMA signature code.

22 Claims, 3 Drawing Sheets

| HOST ROUTING TABLE |||
| DST SUBNET IP ADDRESS | DWDM WAVELENGTH ASSIGNMENT | OCDMA CODE ASSIGNMENT |
| --- | --- | --- |
| 211  a1.b1 | 221 | 231  c[1] |
| 212  .b2 | 222 | 232  c[2] |
| 213  .b3 | 223 | 233  c[3] |
| 214  a2.b1 | 224 | 234  c[1] |
| 215  .b2 | 225 | 235  c[2] |
| 216  .b3 | 226 | 236  c[3] |
| 217  a3.b1 | 227 | 237  c[1] |
| 218  .b2 | 228 | 238  c[2] |
| 219  .b3 | 229 | 239  c[3] |

*Fig. 2*

| WAVELENGTH CONVERSION TABLE |||
| --- | --- | --- |
| NET IP ADDRESS | DWDM WAVELENGTH ASSIGNMENT (UPSTREAM) | DWDM WAVELENGTH ASSIGNMENT (DOWNSTREAM) |
| 311    a1 | 321 | 331 |
| 314    a2 | 324 | 334 |
| 317    a3 | 327 | 337 |

INTERNET PROTOCOL ROUTING WITH OPTICAL CODE DIVISION MULTIPLE ACCESS

FIELD OF THE DISCLOSURE

The present disclosure generally relates to network communication. And, in particular, the present disclosure relates to Internet protocol routing.

BACKGROUND

Networks are used in a variety of settings to record, manipulate, and/or transfer data. The networks utilize computing devices and other hardware components (i.e., network components) that are electrically and/or optically coupled to communicate information.

The computing devices and other hardware components can, for example, record and transmit data to and/or from network components. The coupling of these computing devices and the other hardware components creates a network where each computing device and/or other hardware component can communicate with each other through the network.

There are a variety of types of networks, including local area networks (LANs) and wide area networks (WANs), such as an intranet and the Internet. The interconnections in modern communications networks, such as LANs or WANs, originate from copper cabling. Copper cabling has been used because it was relatively inexpensive and robust.

As the bandwidth demands for the networks increase, point-to-point interconnections have become the standard connection type. Point-to-point interconnections have led to the development of the overall topology and functionality of large global networks.

Bandwidth demand has continued to increase and fiber optic cabling has begun to replace copper. Multi-mode optical fiber cable and single-mode optical fiber cable have been introduced to these network types.

Dense wavelength division multiplexing (DWDM) photonic technology has been developed to increase the capacity of a single, single-mode fiber optic cable. However, this photonic technology is implemented as point-to-point interconnections and the functionality of these networks has remained the same as those developed for the point-to-point interconnections.

Internet protocol (IP) routing with point-to-point interconnects over photonic technology has a limitation in that the IP packets are converted from optical to electrical to optical along the network. This conversion is utilized so that the information associated with the IP packet can be read correctly and routed along the network at the various routers that are located throughout the network.

SUMMARY

Embodiments of the present disclosure include systems, networks, and methods of providing an Internet protocol routing network. Embodiments of the present disclosure can be utilized in computing devices that are part of LANs and WANs, among other types of computer networks, to communicate between computing devices. In various embodiments of an Internet protocol routing network, the network can be used, for example, to transfer signals between computing devices on a single-mode optical fiber cable.

For example, in some embodiments, an Internet protocol routing network can include: a number of local subnet routers, where the routers are Internet protocol (IP) enabled; a single mode optical fiber cable, where the local subnet routers are coupled to the optical fiber cable; and a number of optical code division multiple access (OCDMA) encoder/decoders coupled to the optical fiber cable, where a number of channels associated with the local subnet routers are assigned an OCDMA signature code.

In various embodiments, the number of OCDMA encoders/decoders can be coupled to a number of DWDM structures via the optical fiber cable. The channels associated with the local subnet routers can be assigned an IP address.

In some embodiments, the OCDMA signature codes assigned to the channels associated with the local subnet routers can be mapped to a group of DWDM wavelengths. A host routing structure can provide the DWDM wavelengths that can be mapped to the OCDMA signature codes assigned to the channels associated with the local subnet routers. This, for example, allows the IP routing decisions for the channels to be implemented and performed by the DWDM wavelength signaling.

In some embodiments, the host routing structure can map the IP address assigned to the channels associated with the local subnet routers with an OCDMA signature code and a group of DWDM wavelengths. In some embodiments, for example, the OCDMA signature codes assigned to the channels associated with the local subnet routers can share the same group of DWDM wavelengths.

In various embodiments, the OCDMA encoder/decoders can be initialized with a DWDM assignment according to a wavelength conversion table. The wavelength conversion table can convert, for example, a first DWDM wavelength group of a group of OCDMA signature codes to a second DWDM wavelength group.

OCDMA can be used, for example, as a channel sharing technique to allow multiple networks to share the same group of DWDM wavelengths. The use of OCDMA signature codes can allow for multiple channels to coexist over the same DWDM wavelength groups and travel on the same optical fiber cable, in some embodiments.

The present disclosure also includes a number of method embodiments. For example, various embodiments can include a method for operating an Internet protocol routing network. A method for operating an Internet protocol routing network can include: routing a number of channels associated with a local subnet router on an optical fiber cable, where the channels are IP enabled and the local subnet router is coupled to the optical fiber cable; assigning an OCDMA signature code to each of the channels with an OCDMA encoder/decoder; and mapping the OCDMA signature codes assigned to the channels associated with the local subnet routers to a group of DWDM wavelengths.

In some embodiments, the method can include assigning one or more of the channels associated with the local subnet routers an IP address. The method can include, for example, providing a host routing structure to define the DWDM wavelengths that will be mapped to the OCDMA signature codes assigned to the channels associated with the local subnet routers.

In various embodiments, the method can include a host routing structure mapping the IP address assigned to the channels associated with the local subnet routers with an OCDMA signature code and a group of DWDM wavelengths. The method can include initializing the OCDMA encoder/decoders with a DWDM assignment according to a wavelength conversion table.

In some embodiments, a method can include converting a first DWDM wavelength group associated with a group of OCDMA signature codes to a second DWDM wavelength group according to a wavelength conversion table. The OCDMA signature codes can be preserved during the conversion from the first DWDM wavelength group to the second DWDM wavelength group. In some embodiments, the conversion from the first DWDM wavelength group to the second DWDM wavelength group can be performed in the optical domain and does not decode the OCDMA signature codes.

The present disclosure also includes an Internet protocol routing system. In various embodiments the Internet protocol routing system can include: a number of local subnet routers, where the routers are Internet protocol (IP) enabled; a single mode optical fiber cable, where the local subnet routers are coupled to the optical fiber cable; and a number of OCDMA encoder/decoders coupled to the optical fiber cable, where a number of channels associated with the local subnet routers are assigned an OCDMA signature code and where the number of OCDMA encoders/decoders are coupled to a number of DWDM structures via the optical fiber cable; and a computing device, where the computing device includes a computing device readable medium capable of executing a set of computer executable instructions.

In some embodiments, the channels associated with the local subnet routers can be assigned an IP address. The OCDMA signature codes can be assigned to the channels associated with the local subnet routers and can be mapped to a group of DWDM wavelengths.

In various embodiments, the computing device can include executable instructions for a host routing structure to provide the DWDM wavelengths that will be mapped to the OCDMA signature codes assigned to the channels associated with the local subnet routers. The host routing structure can map, for example, the IP address assigned to the channels associated with the local subnet routers with an OCDMA signature code and a group of DWDM wavelengths.

In some embodiments, the OCDMA encoder/decoders can be initialized with a DWDM assignment according to a wavelength conversion table and the wavelength conversion table converts a first DWDM wavelength group associated with a group of OCDMA signature codes to a second DWDM wavelength group.

In various embodiments, the OCDMA signature codes can be preserved during the conversion from the first DWDM wavelength subgroup to the second DWDM wavelength group. For example, the conversion from the first DWDM wavelength group to the second DWDM wavelength group can be performed in the optical domain and does not decode the OCDMA signature codes.

BRIEF DESCRIPTION OF THE DRAWINGS

FIG. 2 is an illustration of a host routing table mapping IP addresses to groups of DWDM wavelengths and OCDMA codes according to an embodiment of the present disclosure.

FIG. 3 is an illustration of a wavelength conversion table that maps IP addresses to groups of DWDM wavelengths according to an embodiment of the present disclosure.

DETAILED DESCRIPTION

Figure 1:
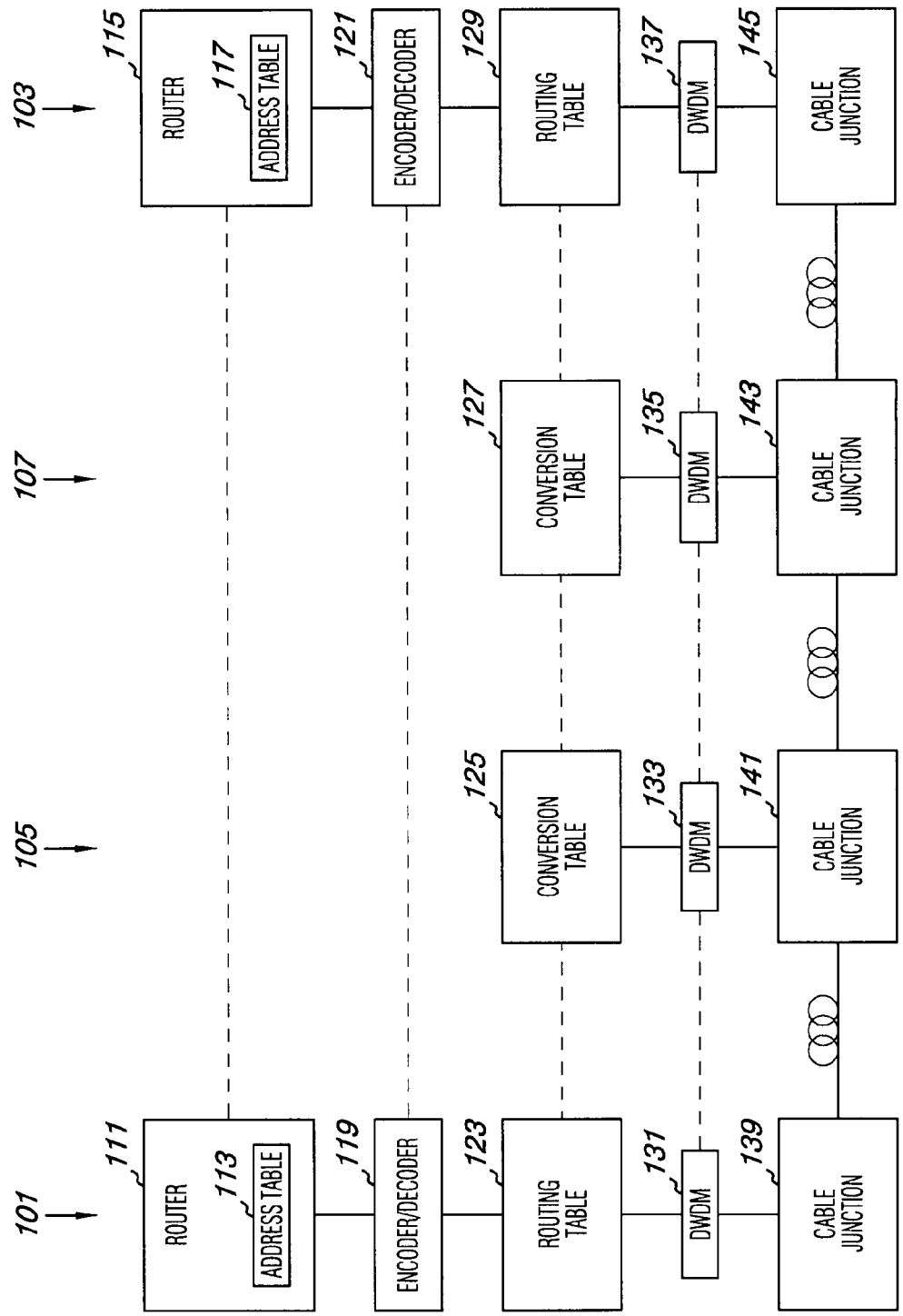
FIG. 1 is an illustration of an Internet protocol routing network having an optical fiber cable with multiple channels according to an embodiment of the present disclosure.

Embodiments of the present disclosure include systems, networks, and methods of providing an Internet protocol routing network. In various embodiments of an Internet protocol routing network, the network can be used, for example, to transfer signals between computing devices on a single-mode optical fiber cable where the signals are routed on the network in an optical state.

In various embodiments, an Internet protocol routing network can, for example, include: a number of local subnet routers, where the routers are Internet protocol (IP) enabled; a single mode optical fiber cable, where the local subnet routers are coupled to the optical fiber cable; and a number of OCDMA encoder/decoders coupled to the optical fiber cable, where a number of channels associated with the local subnet routers are assigned an OCDMA signature code.

Embodiments of the present disclosure are described in relation to the accompanying drawings, which will at least assist in illustrating the various features of the various embodiments. In the Figures, the first digit of a reference number refers to the Figure in which it is used, while the remaining two digits of the reference number refer to the same or equivalent parts of embodiment(s) of the present disclosure used throughout the several figures of the drawing. The scaling of the Figures does not represent precise dimensions and/or dimensional ratios of the various elements illustrated herein.

FIG. 1 is an illustration of an Internet protocol routing network having an optical fiber cable with multiple channels according to an embodiment of the present disclosure. In various embodiments, the Internet protocol routing network, such as in FIG. 1, can include several IP DWDM host adapters (e.g., IP DWDM host adapters 101 and 103).

The IP DWDM host adapters 101 and 103 can include a number of local subnet routers, such as local subnet router 111 on IP DWDM host adapter 101 and local subnet router 115 on IP DWDM host adapter 103. The local subnet routers can act as a hub for the computing devices on the network. The computing devices can connect to the local subnet router to transfer signals on the network optically.

The local subnet routers can be coupled to a number of channels that are associated with a number of computing devices on the network. The local subnet routers 111 and 115 can include the IP addresses associated with the network channels that are transferring signals on the network. The IP addresses can be stored in an IP address table, such as IP address table 113 on local subnet router 111 and IP address table 117 on local subnet router 115.

In the embodiment of FIG. 1, the channels that are transferring signals on the network through local subnet routers 111 and/or 115 are coupled to an OCDMA encoder/decoder. Local subnet router 111 can be coupled to OCDMA encoder/decoder 119 and local subnet router 115 can be coupled to OCDMA encoder/decoder 121.

The OCDMA encoders/decoders 119 and 121 can receive a signal from the local subnet routers 111 and/or 115 and can be designed to convert the signal to an optical code and assign an OCDMA signature code to the signal, in some embodiments. The signal can then be transferred on an optical fiber cable and be associated with a given channel on the network based on the OCDMA signature code that was assigned to the signal.

In the embodiment of FIG. 1, the signal that has been assigned an OCDMA signature code by the OCDMA encoder/decoder 119 and/or 121 can then be given a DWDM wavelength assignment. The DWDM wavelength assignment can be performed at DWDM structures 131 and/or 137.

The DWDM structures 131 and 137 can be coupled to a host routing table 123 and/or 129. The host routing tables 123 and 129 can be used to assign a group of wavelengths for signals associated with an OCDMA signature code and an IP address to travel on in the optical fiber cable.

The signal traveling on a channel can be assigned an IP address and an OCDMA signature code. The use of OCDMA signature codes, for example, allows for multiple channels to coexist over the same DWDM wavelength groups.

In some embodiments, the signal that is assigned an IP address, an OCDMA signature code, and a group of wavelengths can be transferred through the network on an optical fiber cable which can be coupled to the various components of the IP DWDM host adapter via an optical fiber cable junction. In such embodiments, the signal reaches intermediate IP DWDM routers before reaching another local subnet router, which then sends the signal to a computing device on the network. The use of OCDMA signature codes, for example, allows for multiple signals from multiple computing devices to travel on the same optical fiber cable.

In the embodiment of FIG. 1, the signal that is being transferred on the network through an optical fiber cable can travel from IP DWDM host adapter 101 to IP DWDM router 105. In the embodiment of FIG. 1, the signal leaves the optical fiber cable junction 139 of local subnet router 111 and enters the IP DWDM router 105 via optical fiber cable junction 141.

At the IP DWDM router, the signal can be converted from the incoming DWDM wavelengths for a group of OCDMA codes associated with the signal to a different DWDM wavelength group. The conversion from the incoming DWDM wavelengths to a different DWDM wavelength group takes place in DWDM structure 133.

The wavelengths that are assigned to the group of OCDMA codes in DWDM structure 133 can be, for example, provided by DWDM wavelength conversion table 125. The use of an OCDMA signature code for a signal and a mapping the signal to a DWDM wavelength can, for example, eliminate the need for an optical to electrical to optical conversion of the signal at each of the routers along the network.

The signal can be transferred through the network on the optical fiber cable via optical fiber cable junction 141 on the new DWDM wavelengths that were assigned to the signal associated with the OCDMA codes. The switching of the wavelengths can be completed in the optical domain and, accordingly, the OCDMA codes associated with the signal do not have to be decoded and then encoded again in the IP DWDM router.

In the embodiment of FIG. 1, the signal that is being transferred on the network through an optical fiber cable can travel from IP DWDM host adapter 101 to IP DWDM router 107. In such embodiments, the signal enters the IP DWDM router 107 via optical fiber cable junction 143.

At the IP DWDM router 107, the signal can be converted from the incoming DWDM wavelengths for a group of OCDMA codes associated with the signal that were assigned at DWDM structure 133 to a different DWDM wavelength group. The conversion from the incoming DWDM wavelengths to a different DWDM wavelength group can, for example, take place in DWDM structure 135.

The wavelengths that are assigned to the group of OCDMA codes in DWDM structure 135 can, for example, be provided by DWDM wavelength conversion table 127. The conversion from the incoming DWDM wavelength group to a different DWDM wavelength group can, for example, be performed in the optical domain and does not have to decode the OCDMA signature codes.

The signal can be transferred through the network on the optical fiber cable via optical fiber cable junction 143 on the new DWDM wavelengths that were assigned to the signal associated with the OCDMA codes. The signal can, for example, be received by optical fiber cable junction 145.

In the embodiment of FIG. 1, the signal enters OCDMA encoder/decoder 121 where the OCMDA signature code can be decoded and the associated signal can be routed through local subnet router 115 on the channel that the OCDMA signature code was associated with. The signal can be converted to an electrical signal and routed on the channel to the computing device connected to the network that was associated with IP address of the signal.

In the embodiment of FIG. 1, a signal can be transferred between IP DWDM host adapters 101 and 103 in both directions. Data associated with multiple channels and/or IP addresses can be transferred simultaneously through the optical fiber cable Internet protocol routing network. This can be accomplished, for example, by assigning and transferring the signal associated with a given channel/IP address on a group of wavelengths in the optical fiber cable.

FIG. 2 is an illustration of a host routing table mapping IP addresses to groups of DWDM wavelengths and OCDMA codes according to an embodiment of the present disclosure. In the embodiment of FIG. 2, a host routing table assigns the OCDMA codes and IP addresses associated with a signal to a DWDM wavelength group.

In the embodiment of FIG. 2, the host routing table includes a list of the destination (dst) subnet IP addresses 210. An IP address can be assigned to a signal that is associated with a channel in a local subnet router. The IP address can, for example, be assigned at the local subnet router to associate the signal with a given location on the network, such as a computing device.

In the embodiment of FIG. 2, the host routing table includes a list of the DWDM wavelength assignments 220. A DWDM wavelength can be assigned to a signal that is assigned a given IP address in a local subnet router. A DWDM wavelength can, for example, be assigned at a DWDM structure to define the wavelength of the signal associated with a given IP address on the network.

In the embodiment of FIG. 2, the host routing table includes a list of the OCDMA signature code assignments 230. An OCDMA signature code can, for example, be assigned to a signal that is assigned a given IP address in a local subnet router. The OCDMA signature codes associated with an IP address can be assigned to a DWDM wavelength for the signal to travel on in the network.

In various embodiments, the signal associated can be assigned an IP address in a format having an alpha numeric sequence, separated by a period, and another alpha numeric sequence, for example, a1.b1. In such embodiments, the IP addresses can be assigned, for example, starting with a1.b1 and continuing with a1.b2 to a1.bx. IP addresses can also utilize, for example, a2.b1 to a2.bx, a3.b1 to a3.bx, and so on in this manner, among other addressing sequences.

In the embodiment of FIG. 2, the IP address a1.b1 at 211 is assigned OCDMA signature code c[1] 231 and is mapped to DWDM wavelength 221, according to the host routing table. The DWDM wavelength 221 can include a group of wavelengths, such as wavelengths $\lambda_1$-$\lambda_k$.

In the embodiment of FIG. 2, the IP addresses a1.b2 at 212 and a1.b3 at 213 are assigned OCDMA signature codes c[2] 232 and c[3] 233, respectively. These IP addresses 212 and 213 are mapped to DWDM wavelengths 222 and 223, respectively.

The wavelengths included in DWDM wavelengths 222 and 223 are $\lambda_1$-$\lambda_k$, the same as the wavelengths for the signal associated with IP address 211. The signals associated with IP addresses 211, 212, 213 can all be assigned to the same range of wavelengths, as multiple signals associated with different IP addresses can travel over an optical fiber cable at the same time due to the OCDMA signature code that is assigned to each signal.

In the embodiment of FIG. 2, the IP address a2.b1 at 214 is assigned OCDMA signature code c[1] 234 and is mapped to DWDM wavelength 224, according to the host routing table. In some embodiments, the DWDM wavelength 224 can include a group of wavelengths, such as wavelengths $\lambda_{k+1}$-$\lambda_{2k}$.

In the embodiment of FIG. 2, the IP addresses a2.b2 at 215 and a2.b3 at 216 are assigned OCDMA signature codes c[2] 235 and c[3] 236, respectively. These IP addresses 215 and 216 are mapped to DWDM wavelengths 225 and 226, respectively.

The wavelengths included in DWDM wavelengths 225 and 226 are $\lambda_{k+1}$-$\lambda_{2k}$, the same as the wavelengths for the signal associated with IP address a2.b1 at 214. As with the example provided above, the signals associated with IP addresses 214, 215, 216 can all be assigned to the same range of wavelengths, as multiple signals associated with different IP addresses can travel over an optical fiber cable at the same time due to the OCDMA signature code that is assigned to each signal.

In the embodiment of FIG. 2, the IP address a3.b1 at 217 is assigned OCDMA signature code c[1] 237 and is mapped to DWDM wavelength 227, according to the host routing table. The DWDM wavelength 227 can include a group of wavelengths, such as wavelengths $\lambda_{2k+1}$-$\lambda_{3k}$.

In the embodiment of FIG. 2, the IP addresses a3.b2 at 218 and a3.b3 at 219 are assigned OCDMA signature codes c[2] 238 and c[3] 239, respectively. These IP addresses 218 and 219 are mapped to DWDM wavelengths 228 and 229, respectively.

The wavelengths included in DWDM wavelengths 228 and 229 are $\lambda_{2k+1}$-$\lambda_{3k}$, the same as the wavelengths for the signal associated with IP address 217. The signals associated with IP addresses 217, 218, 219 can all be assigned to the same range of wavelengths as multiple signals associated with different IP addresses can travel over an optical fiber cable at the same time due to the OCDMA signature code that is assigned to each signal.

In various embodiments, the signals that are assigned to an IP address with the same prefix (e.g., a1, a2, and a3) can be assigned the same OCDMA code (e.g., c[1], c[2], and c[3]). This is because the signals with a given IP address prefix will travel on a different DWDM wavelength group than a signal with a different IP address prefix.

For example, signals with an IP address prefix a1 can be mapped to DWDM wavelengths $\lambda_1$-$\lambda_k$, according to the embodiment of FIG. 1. Signals with an IP address prefix a2 can be mapped to DWDM wavelengths $\lambda_{k+1}$-$\lambda_{2k}$ and signals with an IP address prefix a3 can be mapped to DWDM wavelengths $\lambda_{2k+1}$-$\lambda_{3k}$, according to the embodiment of FIG. 1. Such an assignment and mapping sequence can continue for all signals that are routed on an Internet routing protocol network.

FIG. 3 is an illustration of a wavelength conversion table that maps IP addresses to groups of DWDM wavelengths according to an embodiment of the present disclosure. In the embodiment of FIG. 3, a wavelength conversion table maps signals with a given IP address prefix to a DWDM wavelength group.

In various embodiments, a signal that is being routed on an Internet protocol routing network that can be coupled to a number of IP DWDM routers. The IP DWDM routers route the signal on the network by assigning the signal to a DWDM wavelength and transfer the signal on the network at the assigned DWDM wavelength.

At each of the IP DWDM routers a new DWDM wavelength can be assigned to the signal. In various embodiments, a signal associated with a given IP address can be mapped to a given DWDM wavelength. In some embodiments, the DWDM wavelength that is mapped to a given signal associated with a given IP address can also be dependent on the direction of the signal's flow on the network.

In the embodiment of FIG. 3, the signals associated with an IP address prefix of a1 at 311 are mapped with a DWDM wavelength 321 (e.g., $\lambda_1$-$\lambda_k$) when the signal is traveling upstream in the network. In contrast, the signals associated with an IP address prefix of a1 at 311 are mapped with a DWDM wavelength 331 (e.g., $\lambda_{2k+1}$-$\lambda_{3k}$) when the signal is traveling downstream in the network.

In the embodiment of FIG. 3, the signals associated with an IP address prefix of a2 at 314 are mapped with a DWDM wavelength 324 (e.g., $\lambda_{k+1}$-$\lambda_{2k}$) when the signal is traveling upstream in the network. In contrast, the signals associated with an IP address prefix of a2 at 314 are mapped with a DWDM wavelength 334 (e.g., $\lambda_1$-$\lambda_k$) when the signal is traveling downstream in the network.

In the embodiment of FIG. 3, the signals associated with an IP address prefix of a3 at 317 are mapped with a DWDM wavelength 327 (e.g., $\lambda_{2k+1}$-$\lambda_{3k}$) when the signal is traveling upstream in the network. In contrast, the signals associated with an IP address prefix of a3 at 317 are mapped with a DWDM wavelength 337 (e.g., $\lambda_{k+1}$-$\lambda_{2k}$) when the signal is traveling downstream in the network.

In some embodiments, the mapping of the same DWDM wavelength groups to upstream and downstream traffic can be done because the IP address prefixes associated with the signals are different and the optical fiber cable can allow for multiple signals at different wavelengths to be transferred on it at the same time.

In the embodiment of FIG. 3, the DWDM wavelength groups are assigned to signals associated with an IP address prefix at an DWDM host adapter and/or and DWDM router. At the host adapter and/or router, the signal is mapped to a DWDM wavelength based on the IP address prefix of the signal and the direction of travel (e.g., upstream or downstream) of the signal.

A DWDM wavelength from a defined group of DWDM wavelengths can be mapped to signals traveling in a certain direction that have a given IP address prefix. The DWDM wavelengths mapped will vary based on the prefix and the direction of travel. At a host adapter or router, the same group of DWDM wavelengths as was previously used can be used to map a signal to a wavelength when the signal has a different IP address prefix and is traveling in a different direction. Accordingly, such embodiments can provide increased network communication and/or the communication of secured and/or unsecured information in the same optical communication path (e.g., optical fiber).

It is to be understood that the above description has been made in an illustrative fashion, and not a restrictive one. Combination of the above embodiments, and other embodiments not specifically described herein will be apparent to those of ordinary skill in the art upon reviewing the above description.

The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. An Internet protocol routing network, comprising:
a number of local subnet routers, where the routers are Internet protocol (IP) enabled;
a single mode optical fiber cable, where the local subnet routers are coupled to the optical fiber cable; and
one or more optical code division multiple access (OCDMA) encoder/decoders coupled to the optical fiber cable, where a number of channels associated with the local subnet routers are each assigned an OCDMA signature code and an IP address and are mapped to a first group of DWDM wavelengths for downstream traffic and to a second group of DWDM wavelengths for upstream traffic where the OCDMA encoder/decoders are each initialized with a DWDM assignment according to a wavelength conversion table, and where the first group of DWDM wavelengths for downstream traffic are converted to a third DWDM wavelength group without decoding the OCDMA signature codes and the second group of DWDM wavelengths for upstream traffic are converted to a fourth DWDM wavelength group without decoding the OCDMA signature codes.

2. The network of claim 1, where the one or more OCDMA encoder/decoders are coupled to a number of DWDM structures via the optical fiber cable.

3. The network of claim 1, where a host routing structure defines which DWDM wavelengths will be mapped to the OCDMA signature codes assigned to the number of channels associated with the local subnet routers.

4. The network of claim 3, where the host routing structure maps each IP address assigned to the number of channels associated with the local subnet routers with an OCDMA signature code and a group of DWDM wavelengths.

5. The network of claim 1, where the OCDMA signature codes assigned to the number of channels associated with the local subnet routers share the same group of DWDM wavelengths.

6. The network of claim 5, where the one or more OCDMA encoder/decoders are initialized with a DWDM assignment according to a wavelength conversion table.

7. The network of claim 6, where the wavelength conversion table defines the conversion of a DWDM wavelength group for a group of OCDMA signature codes to another DWDM wavelength group.

8. A method for operating an Internet protocol routing network, comprising:
routing a number of channels associated with a local subnet router on an optical fiber cable, where the channels are IP enabled and the local subnet router is coupled to the optical fiber cable;
assigning an OCDMA signature code to each of the channels with an OCDMA encoder/decoder;
initializing the OCDMA encoder/decoder with a DWDM assignment according to a wavelength conversion table;
mapping the OCDMA signature codes assigned to the channels associated with the local subnet routers to a first group of DWDM wavelengths for downstream traffic and to a second group of DWDM wavelengths for upstream traffic; and
converting the first group of DWDM wavelengths for downstream traffic to a third DWDM wavelength group without decoding the OCDMA signature codes and the second group of DWDM wavelengths for upstream traffic to a fourth DWDM wavelength group without decoding the OCDMA signature codes.

9. The method of claim 8, where the method includes assigning the channels associated with the local subnet routers an IP address.

10. The method of claim 9, where the method includes providing a host routing structure to define the DWDM wavelengths that will be mapped to the OCDMA signature codes assigned to the channels associated with the local subnet routers.

11. The method of claim 8, where the method includes a host routing structure mapping the IP addresses assigned to the channels associated with the local subnet routers with OCDMA signature codes and a group of DWDM wavelengths.

12. The method of claim 8, where the method includes initializing the OCDMA encoder/decoder with a DWDM assignment according to a wavelength conversion table.

13. The method of claim 12, where the method includes converting a DWDM wavelength group for a group of OCDMA signature codes to another DWDM wavelength group according to a wavelength conversion table.

14. The method of claim 13, where the OCDMA signature codes are preserved during the conversion from the DWDM wavelength group to another DWDM wavelength group.

15. The method of claim 14, where the conversion from the DWDM wavelength group to another DWDM wavelength group is performed in the optical domain.

16. An Internet protocol routing system, comprising:
a number of local subnet routers, where the routers are Internet protocol (IP) enabled;
a single mode optical fiber cable, where the local subnet routers are coupled to the optical fiber cable; and
a number of OCDMA encoder/decoders coupled to the optical fiber cable, where a number of channels associated with the local subnet routers are each assigned an OCDMA signature code and are mapped to a first group of DWDM wavelengths for downstream traffic and to a second group of DWDM wavelengths for upstream traffic, where the number of OCDMA encoder/decoders are coupled to a number of DWDM structures via the optical fiber cable, where the OCDMA encoder/decoders are each initialized with a DWDM assignment according to a wavelength conversion table, and where the first group of DWDM wavelengths for downstream traffic are converted to a third DWDM wavelength group without decoding the OCDMA signature codes and the second group of DWDM wavelengths for upstream traffic are converted to a fourth DWDM wavelength group without decoding the OCDMA signature codes; and
a computing device, where the computing device includes a computing device readable medium capable of executing a set of computing device executable instructions.

17. The system of claim 16, where the channels associated with the local subnet routers are assigned an IP address.

18. The system of claim 16, where the computing device includes executable instructions for a host routing structure to provide the DWDM wavelengths that will be mapped to the OCDMA signature codes assigned to the channels associated with the local subnet routers.

19. The system of claim 16, where the host routing structure maps the IP address assigned to the channels associated with the local subnet routers with an OCDMA signature code and a group of DWDM wavelengths.

20. The system of claim 16, where the OCDMA encoder/decoders are initialized with a DWDM assignment according to a wavelength conversion table and the wavelength conversion table defines the conversion of a DWDM wavelength group for a group of OCDMA signature codes to another DWDM wavelength group.

21. The system of claim 20, where the OCDMA signature codes are preserved during the conversion from the DWDM wavelength group to another DWDM wavelength group.

22. The system of claim 21, where the conversion from the DWDM wavelength group to another DWDM wavelength group is performed in the optical domain.

* * * * *